US011880157B2

(12) United States Patent
Ikeda

(10) Patent No.: US 11,880,157 B2
(45) Date of Patent: Jan. 23, 2024

(54) SHEET FEED DEVICE AND IMAGE FORMING APPARATUS

(71) Applicant: TOSHIBA TEC KABUSHIKI KAISHA, Tokyo (JP)

(72) Inventor: Wataru Ikeda, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 17/483,865

(22) Filed: Sep. 24, 2021

(65) Prior Publication Data

US 2022/0011709 A1 Jan. 13, 2022

Related U.S. Application Data

(63) Continuation of application No. 16/565,556, filed on Sep. 10, 2019, now Pat. No. 11,156,950.

(51) Int. Cl.

| | |
|---|---|
| ***G03G 15/00*** | (2006.01) |
| ***B65H 5/26*** | (2006.01) |
| ***G03G 15/01*** | (2006.01) |

(52) U.S. Cl.

CPC ........... *G03G 15/6558* (2013.01); *B65H 5/26* (2013.01); *G03G 15/0131* (2013.01); *G03G 15/6508* (2013.01); *B65H 2511/21* (2013.01)

(58) Field of Classification Search

CPC ........... G03G 15/6558; G03G 15/0131; G03G 15/6508; G03G 15/6511; B65H 5/26; B65H 2511/21; B65H 2301/3124; B65H 2403/51; B65H 2404/14211; B65H 2405/332; B65H 2801/06; B65H 5/062

See application file for complete search history.

(56) References Cited

U.S. PATENT DOCUMENTS

| | | | |
|---|---|---|---|
| 8,254,811 | B2 | 8/2012 | Andoh et al. |
| 9,487,368 | B1 | 11/2016 | Ikeda |
| 9,580,266 | B1 | 2/2017 | Bell'Albero et al. |
| 10,139,757 | B2 | 11/2018 | Takahashi et al. |
| 2008/0203649 | A1 | 8/2008 | Watase et al. |
| 2017/0176913 | A1 | 6/2017 | Oya et al. |

OTHER PUBLICATIONS

Non-Final Office Action for U.S. Appl. No. 16/565,556 dated Apr. 2, 2021.

*Primary Examiner* — Walter L Lindsay, Jr.
*Assistant Examiner* — Geoffrey T Evans
(74) *Attorney, Agent, or Firm* — Amin, Turocy & Watson, LLP

(57) ABSTRACT

A sheet feed device comprises a first conveyance path and a second conveyance path which are different sheet conveyance paths, and a conveyance path merging section for merging the first conveyance path and the second conveyance path together. At least one of the first conveyance path and the second conveyance path includes an upstream side roller that feeds sheet to downstream side in a conveyance direction. The conveyance path merging section comprises a conveyance roller pair that conveys the sheet fed from the first conveyance path and the second conveyance path through a nip; a variable mechanism that makes an arrangement angle of one roller of the conveyance roller pair to the other roller thereof variable; and a transmission mechanism that transmits a driving force from the upstream side roller provided in one of the first conveyance path and the second conveyance path to the variable mechanism.

12 Claims, 8 Drawing Sheets

SHEET FEED DEVICE AND IMAGE FORMING APPARATUS

CROSS-REFERENCE TO RELATED APPLICATION

This application is a Continuation of application Ser. No. 16/565,556 filed on Sep. 10, 2019, the entire contents of which are incorporated herein by reference.

FIELD

Embodiments described herein relate generally to a sheet feed device, an image forming apparatus, and methods related thereto.

BACKGROUND

A technology is known to enable movement of a sheet conveyance roller in accordance with an orientation of a conveyance path in a sheet feed device of an image forming apparatus. In this way, an increase in a conveyance resistance caused by a sheet abutting against the sheet conveyance roller can be prevented. It is considered to use a dedicated electric component as an example of a component for enabling the movement of the sheet conveyance roller. However, in a case in which the dedicated electric component is used, a cost of the device increases.

DETAILED DESCRIPTION

In accordance with an embodiment, a sheet feed device comprises a first conveyance path, a second conveyance path and a conveyance path merging section. The first conveyance path and the second conveyance path are mutually different sheet conveyance paths. The conveyance path merging section merges the first conveyance path and the second conveyance path together. At least one of the first conveyance path and the second conveyance path includes an upstream side roller that feeds a sheet to a downstream side in a conveyance direction. The conveyance path merging section comprises a conveyance roller pair, a variable mechanism and a transmission mechanism. The conveyance roller pair conveys the sheet fed from the first conveyance path and the second conveyance path through a nip. The variable mechanism makes an arrangement angle of one roller of the conveyance roller pair to the other roller thereof variable. The transmission mechanism transmits a driving force from the upstream side roller provided in one of the first conveyance path and the second conveyance path to the variable mechanism. In accordance with another embodiment, a sheet feed method involves feeding a sheet to a downstream side in a conveyance direction through an upstream side roller in a first conveyance path or a second conveyance path different from the first conveyance path; and a conveyance path merging section configured to merging the first conveyance path and the second conveyance path together by: conveying the sheet fed from the first conveyance path and the second conveyance path through a nip of a conveyance roller pair; making an arrangement angle of one roller of the conveyance roller pair to another roller thereof variable; and transmitting a driving force from the upstream side roller provided in one of the first conveyance path and the second conveyance path to the variable mechanism.

Hereinafter, a sheet feed device 1 and an image forming apparatus 100 according to an embodiment are described with reference to the accompanying drawings.

Figure 1:
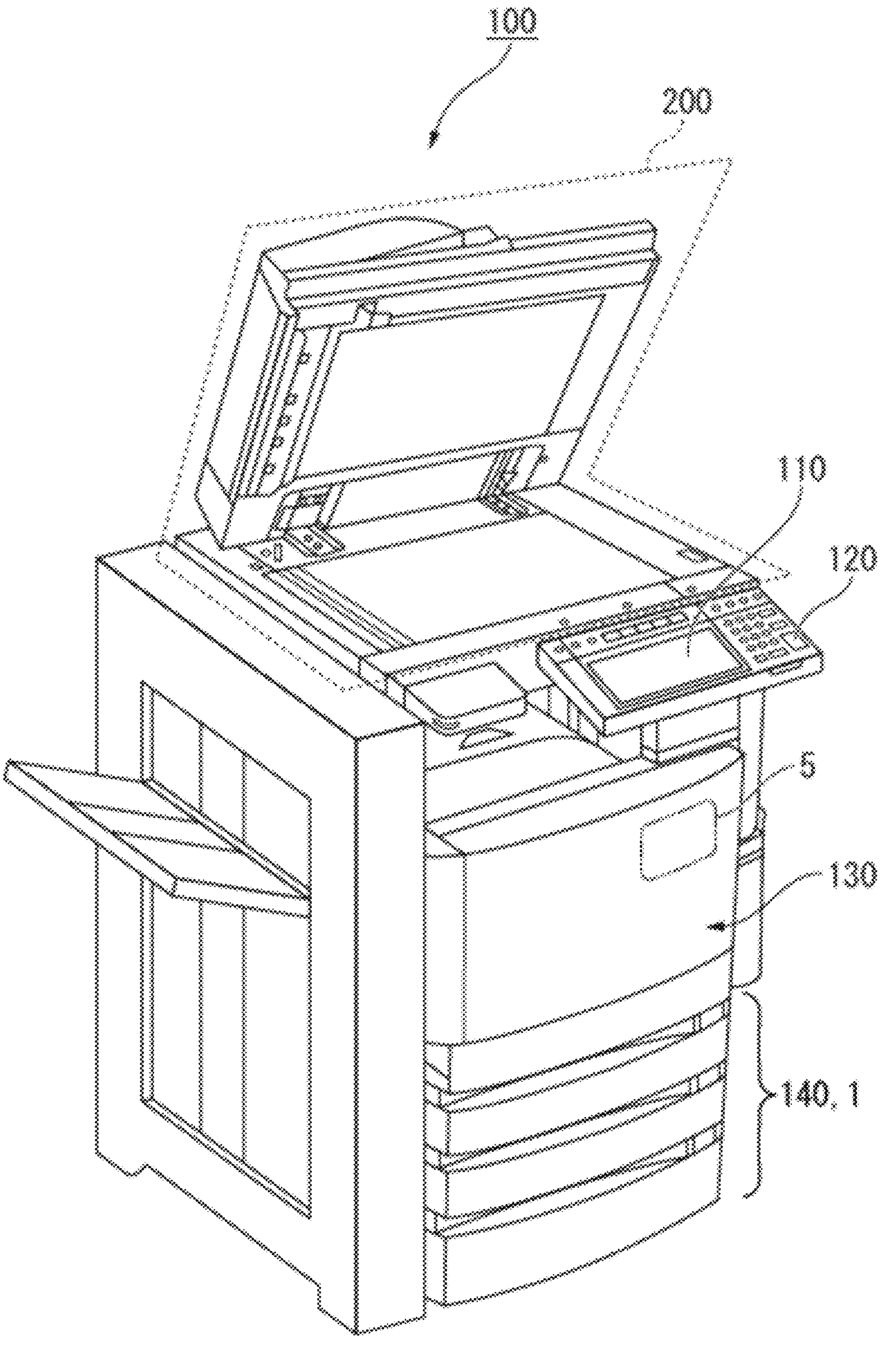
FIG. 1 is a perspective view illustrating an external configuration of an image forming apparatus according to an embodiment.

FIG. 1 is a perspective view illustrating an external configuration of an image forming apparatus 100 according to an embodiment. The image forming apparatus 100 is, for example, a multi-function peripheral. The image forming apparatus 100 includes a display 110, a control panel 120, a printer section (image forming section) 130, a sheet housing section (sheet feed device) 140 and an image reading section 200. The printer section 130 of the image forming apparatus 100 may be a device for fixing a toner image, or an inkjet device.

The image forming apparatus 100 forms an image on a sheet using a developer such as a toner. The sheet is, for example, a plain sheet or a label sheet. Any type of sheet may be used as long as the image forming apparatus 100 can form an image on the surface thereof.

The display 110 is an image display device such as a liquid crystal display or an organic EL (Electro Luminescence) display. The display 110 displays various kinds of information relating to the image forming apparatus 100.

The control panel 120 includes a plurality of buttons. The control panel 120 receives an operation from a user. The control panel 120 outputs a signal corresponding to the operation performed by the user to a control section 5 of the image forming apparatus 100. The display 110 and the control panel 120 may be integrated with each other to form a touch panel.

The printer section 130 forms an image on the sheet based on image information generated by the image reading section 200 or image information received through a communication line. The printer section 130 forms an image through the following processing, for example. An image forming section of the printer section 130 forms an electrostatic latent image on a photoconductive drum based on the image information. The image forming section of the printer section 130 forms a visible image by attaching the developer to the electrostatic latent image.

The developer may be a toner. A transfer section of the printer section 130 transfers the visible image onto the sheet. A fixing section of the printer section 130 fixes the visible image to the sheet by heating and pressurizing the sheet. The sheet on which the image is to be formed may be a sheet accommodated in the sheet housing section 140 or a manually fed sheet.

The sheet housing section 140 accommodates the sheet for image formation in the printer section 130. The sheet housing section 140 conveys the sheet towards the printer section 130. The sheet housing section 140 serves as a sheet feed device 1 of the embodiment.

The image reading section 200 reads the image information of a reading object as intensity of light. The image reading section 200 records the read image information. The recorded image information may be transmitted to another information processing apparatus via a network. The recorded image information may be used for forming an image on the sheet by the printer section 130.

Figure 2:
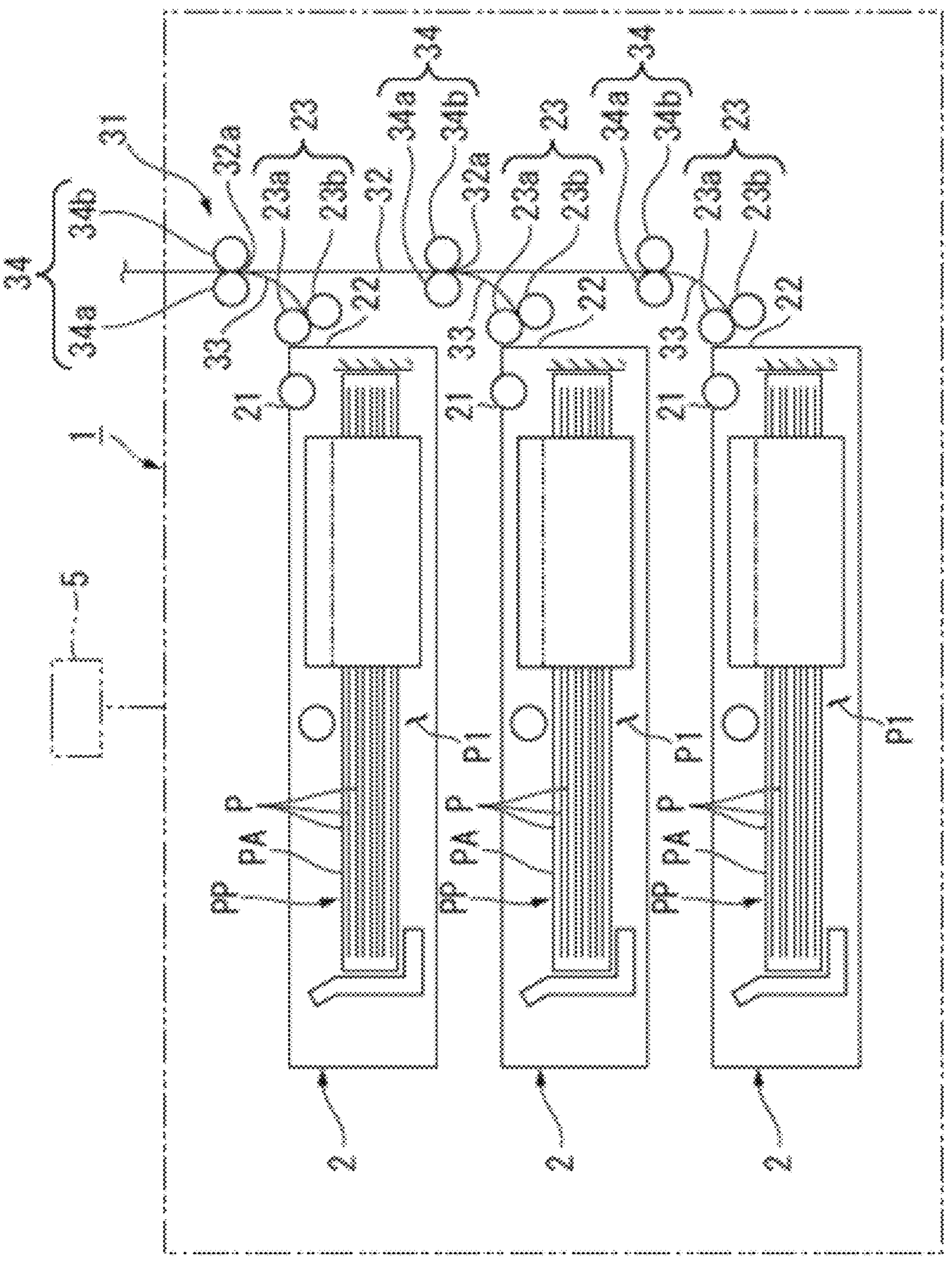
FIG. 2 is a front view illustrating a configuration of a sheet feed device of the image forming apparatus according to the embodiment.

FIG. 2 is a front view illustrating a configuration of the sheet feed device 1 according to the embodiment. The sheet feed device 1 includes a plurality of sheet feed cassettes (sheet feed sections) 2. The plurality of sheet feed cassettes 2 has the same configuration, and is arranged side by side in a vertical direction. Each sheet feed cassette 2 has a substantially horizontal tray structure, and a rectangular sheet P can be substantially horizontally placed thereon. In the sheet feed cassettes 2, the sheets P of different sizes and thicknesses can be placed, respectively.

Each sheet feed cassette 2 includes a sheet placement space P1 in which the sheet P (or a sheet bundle PP) is placed. The sheet placement space P1 is compartmented by a movable guide member. Even a sheet having the maximum sheet size can be placed in the sheet placement space P1. The maximum sheet size is the maximum size among the sheet sizes corresponding to the sheet feed cassettes 2.

In the sheet feed cassette 2, the sheet bundle PP in which a plurality of sheets P is stacked can be placed through replenishment from the outside. The sheet bundle PP can be placed in the sheet feed cassette 2 through a replenishment work for the sheet bundle PP by the user.

The sheet feed cassette 2 conveys the sheet P from a left side to a right side of FIG. 2. In FIG. 2, the left side of the sheet feed cassette 2 is an upstream side in a sheet conveyance direction, and the right side of the sheet feed cassette 2 is a downstream side in the sheet conveyance direction. Hereinafter, the upstream side in the sheet conveyance direction is simply referred to as an upstream side, and the downstream side in the sheet conveyance direction is simply referred to as a downstream side. The sheet feed device 1 includes various rollers each having an axial direction extending along a sheet width direction orthogonal to the sheet conveyance direction. Hereinafter, axial directions of various rollers are referred to as roller axial directions.

A pickup roller 21 is arranged on the right side of the sheet feed cassette 2. The pickup roller 21 is a drive roller. The pickup roller 21 contacts a sheet PA at the uppermost position among the sheet bundle PP placed in the sheet feed cassette 2 (hereinafter, referred to as an uppermost sheet PA). The pickup roller 21 applies a driving force towards the downstream side to the uppermost sheet PA. The pickup roller 21 carries out the sheets P of the sheet bundle PP placed in the sheet feed cassette 2 one by one in order from the uppermost sheet PA. On the right side of the sheet feed cassette 2 in FIG. 2, a carry-out section 22 is provided to be capable of carrying out the sheet P fed by the pickup roller 21 to the outside of the sheet feed cassette.

A separating mechanism 23 is provided on the right side of the carry-out section 22 in FIG. 2. The separating mechanism 23 suppresses double-feeding of the sheets P (two or more sheets P are conveyed in an overlapped state). The separating mechanism 23 includes a sheet feed roller 23*a* and a separating roller 23*b* that radially face each other. The sheet P carried out from the sheet feed cassette 2 passes through the separating mechanism 23 while being sandwiched at a nip between the sheet feed roller 23*a* and the separating roller 23*b*. The nip is a portion where an outer circumferential surface of the sheet feed roller 23*a* contacts (contact in a pressed manner) with an outer circumferential surface of the separating roller 23*b*.

The sheet feed roller 23*a* is a drive roller, and conveys the sheet P at the same speed as the pickup roller 21. The separating roller 23*b* is a driven roller that rotates along with the sheet feed roller 23*a*, and includes a torque limiter 47*c*. The separating roller 23*b* rotates along with the sheet feed roller 23*a* in a case in which the number of sheets P carried out by the pickup roller 21 is one. The separating roller 23*b* stops the rotation to prevent the double-feeding of the sheets P in a case in which the number of sheets P carried out by the pickup roller 21 is two or more.

Figure 5:
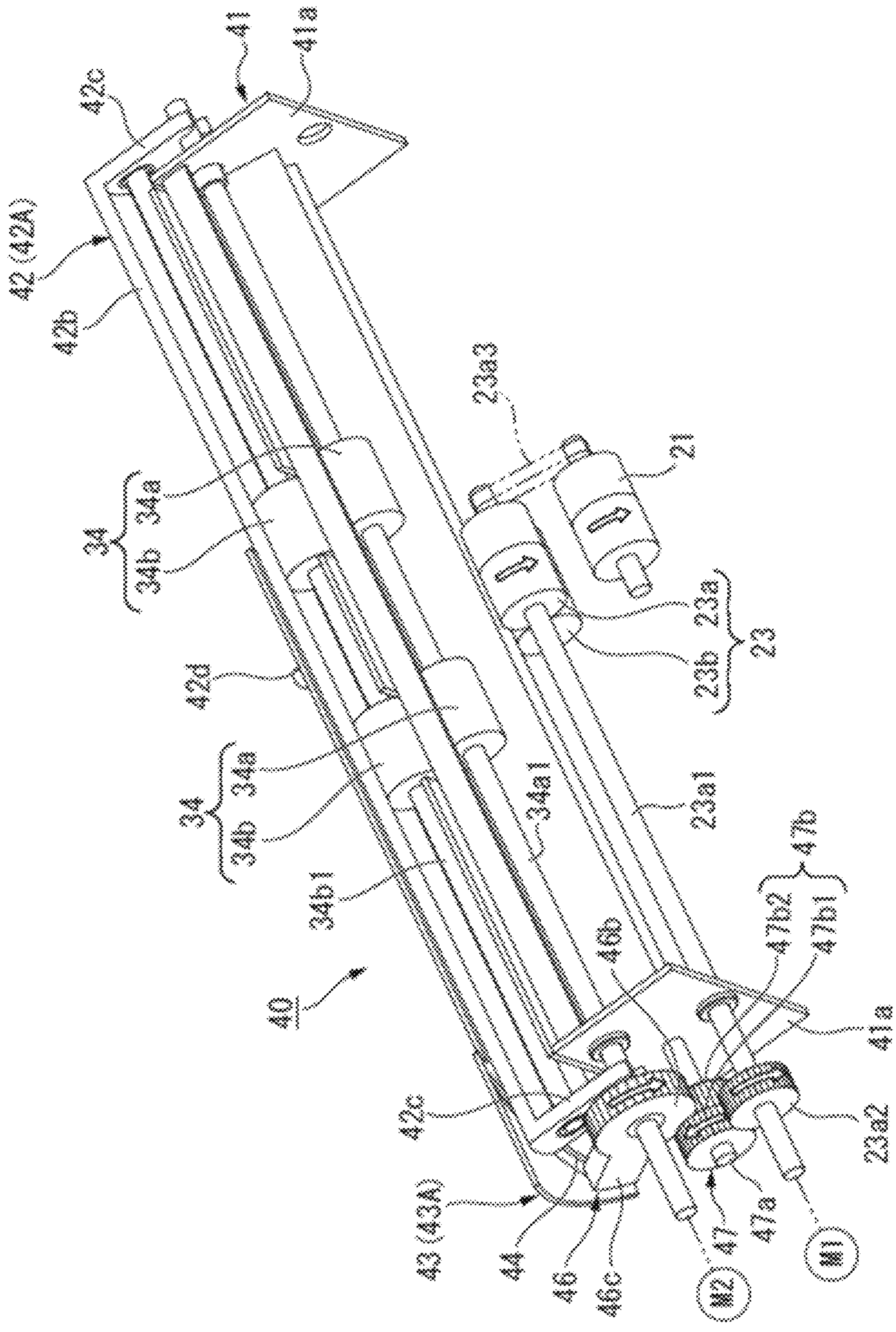
FIG. 5 is a perspective view illustrating an external configuration of a conveyance roller unit arranged in the sheet feed merging section of the sheet feed device according to the embodiment.

In the sheet feed roller 23*a*, a drive motor M1 is provided coaxially on one end side of the support shaft 23*a*1 (refer to FIG. 5). The drive motor M1 applies a rotational driving force to the sheet feed roller 23*a*. The drive motor M1 also applies a rotational driving force to the pickup roller 21 that is not coaxial therewith via a belt 23*a*3. The sheet feed roller 23*a* and the pickup roller 21 are rotationally driven at the same speed.

The sheet P carried out from each sheet feed cassette 2 is conveyed to the printer section 130 via a conveyance device (conveyance module) 31. The conveyance device 31 includes a main conveyance path 32 extending in the vertical direction, carry-out paths 33 extending from the carry-out sections 22 of the respective sheet feed cassette 2 towards the main conveyance path 32, conveyance path merging sections 32*a* respectively merging downstream side ends of the respective carry-out paths 33 in the main conveyance path 32, and conveyance roller pairs respectively provided at the conveyance path merging sections 32*a*. The separating mechanism 23 is provided at an upstream side end of each carry-out path 33.

Each carry-out path 33 extends obliquely upward from the carry-out section 22 of each sheet feed cassette 2 towards the right side (downstream side) in FIG. 2. The sheet conveyance direction of each carry-out path 33 is different from that of the main conveyance path 32 extending in the vertical direction. Each carry-out path 33 and the main conveyance path 32 are different sheet conveyance paths. Each carry-out path 33 is provided with a slope (inclined surface) 33*a* for guiding the sheet P upward.

The carry-out section 22 of each sheet feed cassette 2 carries out the sheet P obliquely upward towards the right side (downstream side) in FIG. 2. In a carry-out direction of the sheet P, the nip of the separating mechanism 23 is arranged. In this way, the sheet P carried out from the sheet feed cassette 2 is smoothly guided to the nip of the separating mechanism 23.

The separating mechanism 23 sandwiches the sheet P inclined upward with the sheet feed roller 23*a* and the separating roller 23*b*. The sheet feed roller 23*a* and the separating roller 23*b* sandwich the sheet P inclined upward in a thickness direction orthogonal to a sheet surface. In the separating mechanism 23, an aligned direction of the sheet feed roller 23*a* and the separating roller 23*b* is inclined with respect to the vertical direction. The aligned direction is inclined so as to be orthogonal to the sheet surface of the sheet P inclined upward as viewed from the roller axial direction.

In the separating mechanism 23, a sheet carry-in/carry-out direction of the nip between the sheet feed roller 23*a* and the separating roller 23*b* is inclined with respect to the horizontal direction. The sheet carry-in/carry-out direction is orthogonal to the aligned direction as viewed from the roller axial direction.

The conveyance roller pair 34 includes a conveyance roller 34*a* and a conveyance pressure roller 34*b* that radially face each other. In the conveyance roller pair 34, the conveyance roller 34*a* is arranged on the sheet feed cassette 2 side, and the conveyance pressure roller 34*b* is arranged on an opposite side of the sheet feed cassette 2 as viewed from the vertical direction. The sheet P carried out from the sheet feed cassette 2 passes through the conveyance roller pair 34 while being sandwiched at a nip 35 between the conveyance roller 34*a* and the conveyance pressure roller 34*b*. Hereinafter, the sheet carry-in/carry-out direction of the nip 35 is indicated by an arrow 35F in the drawings as a nip entering/leaving direction.

The conveyance roller 34*a* is a drive roller, and the conveyance pressure roller 34*b* is a driven roller that rotates along with the conveyance roller 34*a*. In the conveyance roller 34*a*, a drive motor M2 is provided coaxially on one end side of a support shaft 34*a*1 (refer to FIG. 5). The drive motor M2 applies a rotational driving force to the conveyance roller 34*a*.

A pivot position (arrangement angle) of the conveyance pressure roller 34*b* around the support shaft 34*a*1 of the conveyance roller 34*a* is made variable with respect to the conveyance roller 34*a*. The pivot position of the conveyance pressure roller 34*b* is changed through the driving force from the sheet feed roller 23*a* of the carry-out path 33.

In the conveyance roller pair 34, the arrangement angle of the conveyance pressure roller 34*b* is changed to make the nip entering/leaving direction variable. In the conveyance roller pair 34, the pivot position of the conveyance pressure roller 34*b* is changed between a first pivot position P1 (refer to FIG. 3) and a second pivot position P2 (refer to FIG. 4) described below. The first pivot position P1 is a pivot position at which the nip entering/leaving direction is directed to an extending direction (vertical direction) of the main conveyance path 32. The conveyance pressure roller 34*b* is arranged substantially horizontally just beside the conveyance roller 34*a* at the first pivot position P1. The second pivot position P2 is a pivot position at which the nip entering/leaving direction is directed to the carry-out section 22 of the sheet feed cassette 2. The conveyance pressure roller 34*b* is arranged obliquely below the conveyance roller 34*a* at the second pivot position P2.

Figure 3:
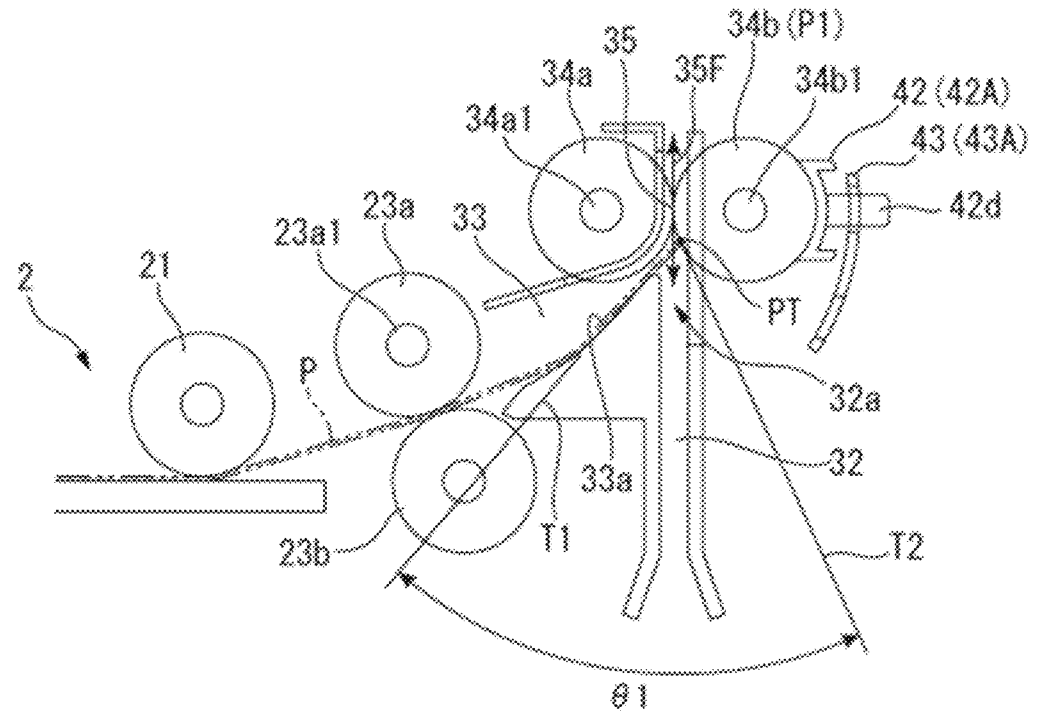
FIG. 3 is a side view illustrating a sheet feed merging section of the sheet feed device according to the embodiment as viewed from a roller axial direction in a state in which a conveyance pressure roller is positioned at a first pivot position.

FIG. 3 is a side view illustrating the conveyance path merging section 32*a* as viewed from the roller axial direction at the time the conveyance pressure roller 34*b* is positioned at the first pivot position P1. FIG. 3 shows a state in which a downstream side end PT of the sheet P fed from the sheet feed cassette 2 reaches the outer circumferential surface of the conveyance pressure roller 34*b* at the first pivot position P1. At this time, an angle θ1 described below formed by the sheet P and the conveyance pressure roller 34*b* is within a range of 45° to 90°. The angle is an angle between the conveyance direction of the downstream side end PT of the sheet P and the nip entering/leaving direction of the conveyance roller pair 34. The angle θ1 is formed by a sheet tangent line T1 and a roller tangent line T2 described below. The sheet tangent line T1 is a tangent line to the sheet surface of the sheet P at a downstream side end position of the sheet P. The roller tangent line T2 is a tangent line to the outer circumferential surface of the conveyance pressure roller 34*b* at the downstream side end position of the sheet P.

For example, the angle θ1 in FIG. 3 is about 64°. If the angle θ1 exceeds 45°, the following effects are achieved. If the angle θ1 is large, the downstream side end PT of the sheet P abuts against the outer circumferential surface of the conveyance pressure roller 34*b*, and thus, the conveyance resistance of the sheet P increases. For example, in a case in which the sheet P placed on the sheet feed cassette 2 is thick and has high rigidity, the conveyance resistance of the sheet P increases. If the sheet P has high rigidity and the angle θ1 is large, the sheet P becomes a resistance to the rotation of the conveyance pressure roller 34*b*, and thus the conveyance resistance of the sheet P increases.

When the conveyance pressure roller 34*b* is positioned at the first pivot position P1, the conveyance roller 34*a* and the conveyance pressure roller 34*b* are substantially horizontally arranged side by side at the same height. At this time, the nip entering/leaving direction of the conveyance roller pair 34 is directed to the vertical direction. Therefore, the nip entering/leaving direction of the conveyance roller pair 34 and the sheet conveyance direction of the main conveyance path 32 are substantially parallel to each other. In this way, the conveyance resistance of the sheet P conveyed upward through the main conveyance path 32 is reduced.

Figure 4:
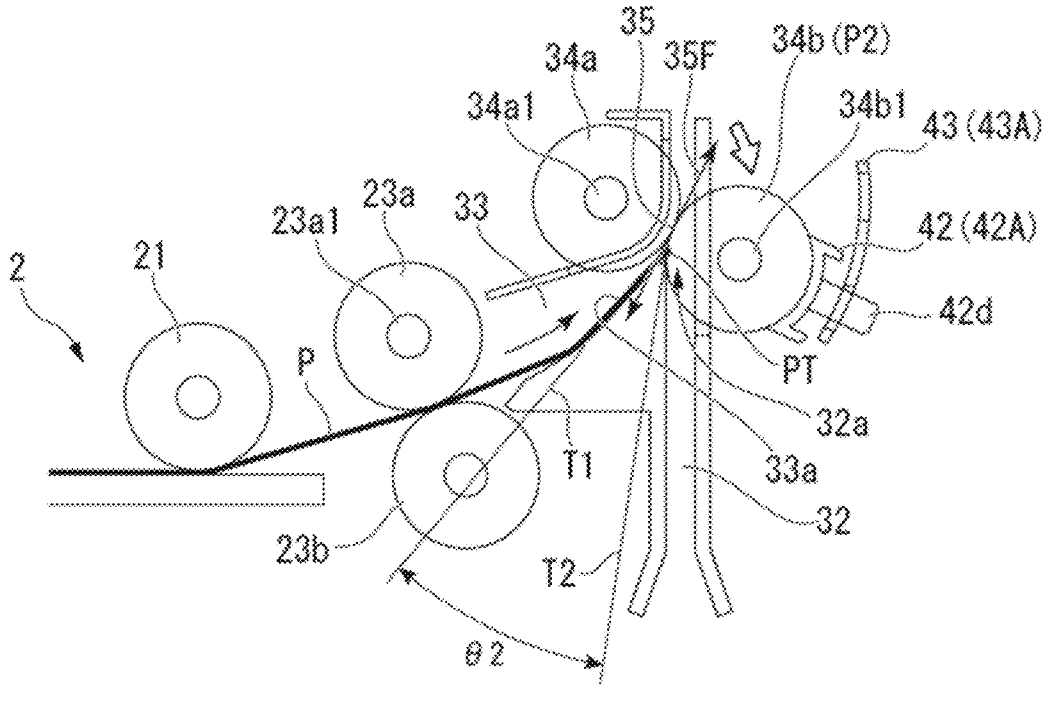
FIG. 4 is a side view illustrating the sheet feed merging section of the sheet feed device according to the embodiment as viewed from the roller axial direction in a state in which the conveyance pressure roller is positioned at a second pivot position.

FIG. 4 is a side view illustrating the conveyance path merging section 32*a* as viewed from the roller axial direction at the time the conveyance pressure roller 34*b* is positioned at the second pivot position P2. FIG. 4 shows a state in which the downstream side end PT of the sheet P fed from the sheet feed cassette 2 reaches the outer circumferential surface of the conveyance pressure roller 34*b* at the second pivot position P2. At this time, an angle θ2 formed by the sheet P and the conveyance pressure roller 34*b* is within a range of 0° to 45°.

For example, the angle θ2 in FIG. 4 is about 31° and is about ½ of the angle θ1 in FIG. 3. If the angle θ2 is less than 45°, the following effects are achieved. If the angle θ2 is small, the downstream side end PT of the sheet P is difficult to abut against the outer circumferential surface of the conveyance pressure roller 34*b*, and thus, the conveyance resistance of the sheet P is reduced.

When the conveyance pressure roller 34*b* is positioned at the second pivot position P2, the conveyance pressure roller 34*b* is arranged obliquely below the conveyance roller 34*a*. At this time, the nip entering/leaving direction of the conveyance roller pair 34 is inclined in such a manner that the nip entering/leaving direction is directed to the carry-out section 22 of the sheet feed cassette 2. Therefore, a relative angle between the nip entering/leaving direction of the conveyance roller pair 34 and the sheet conveyance direction of the carry-out section 22 of the sheet feed cassette 2 is reduced. In this way, the conveyance resistance of the sheet P conveyed from the carry-out section 22 of the sheet feed cassette 2 is reduced.

Figure 6:
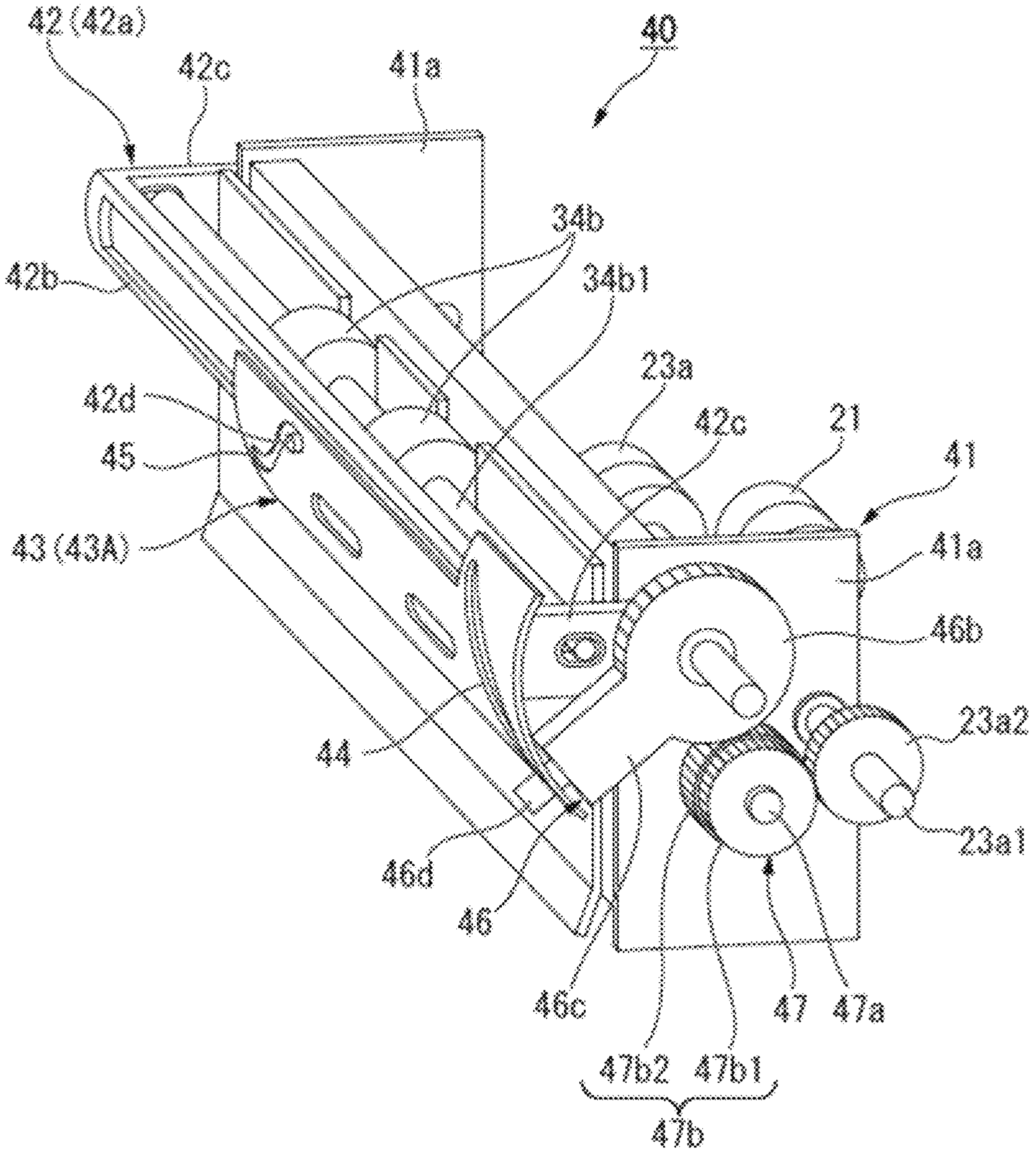
FIG. 6 is a perspective view illustrating an external configuration of the conveyance roller unit arranged in the sheet feed merging section of the sheet feed device according to the embodiment as viewed from a direction different from that of FIG. 5.

FIGS. 5 and 6 are perspective views illustrating an external configuration of a conveyance roller unit 40.

The conveyance roller unit 40 includes a frame 41, the separating mechanism 23 (the sheet feed roller 23*a* and the separating roller 23*b*), the conveyance roller pair 34 (the conveyance roller 34*a* and the conveyance pressure roller 34*b*), a conveyance pressure roller holder 42, a conveyance pressure roller control plate 43, a pivot arm 46 and a relay section 47.

The conveyance pressure roller holder 42 is an operating portion of a variable mechanism 42A. The variable mechanism 42A enables the conveyance pressure roller 34*b* of the conveyance roller pair 34 to pivot around the support shaft 34*a*1 of the conveyance roller 34*a*.

The conveyance pressure roller control plate 43, the pivot arm 46 and the relay section 47 are included in a transmission mechanism 43A. The transmission mechanism 43A transmits the driving force from the sheet feed roller 23*a* of the carry-out path 33 to the operating portion of the variable mechanism 42A.

The frame 41 includes flat side plates 41*a* orthogonal to the roller axial direction on both sides in the roller axial direction thereof. Both ends of the support shaft of each roller except for the conveyance pressure roller 34*b* are respectively supported by the two side plates 41*a*. The frame 41 is supported by a housing of the sheet feed device 1.

The conveyance pressure roller holder 42 includes a beam portion 42*b* extending in the roller axial direction and a pair of arm portions 42*c* extending from both ends of the beam portion 42*b*. The pair of arm portions 42*c* extends to the outside in the roller axial direction of both side plates 41*a*. The pair of arm portions 42*c* is supported by both ends of the support shaft 34*a*1 of the conveyance roller 34*a*. The conveyance pressure roller holder 42 can pivot around the support shaft 34*a*1 of the conveyance roller 34*a*, independently of the driving by the conveyance roller 34*a*. Both ends of a support shaft 34*b*1 of the conveyance pressure roller 34*b* are supported by the pair of arm portions 42*c*. The conveyance pressure roller 34*b* can pivot around the support shaft 34*a*1 of the conveyance roller 34*a* together with the conveyance pressure roller holder 42.

Figure 7:
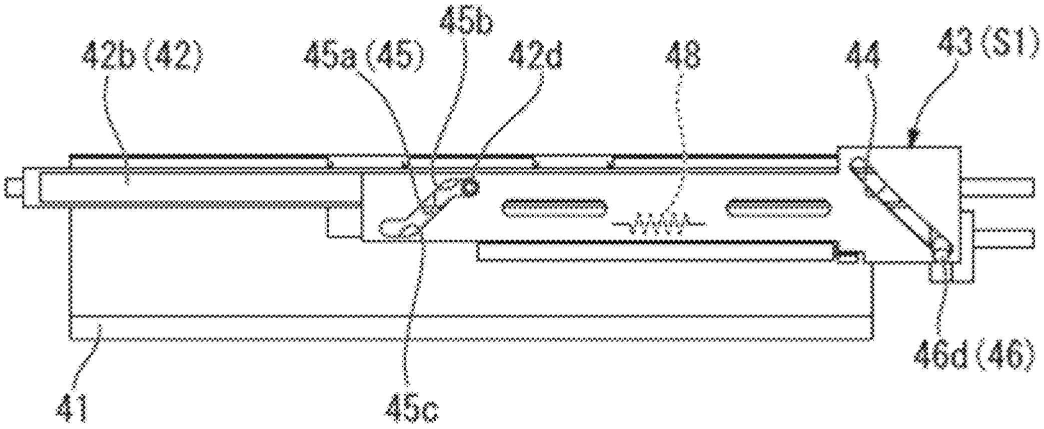
FIG. 7 is a front view illustrating the conveyance roller unit of the sheet feed device according to the embodiment as viewed from a direction orthogonal to the roller axial direction in a state in which a conveyance pressure roller control plate is positioned at a first slide position.
Figure 8:
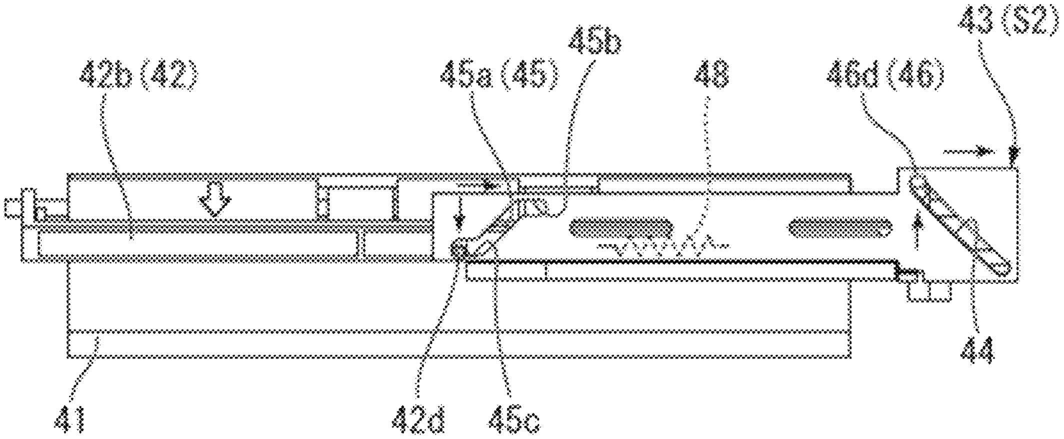
FIG. 8 is a front view illustrating the conveyance roller unit of the sheet feed device according to the embodiment as viewed from the direction orthogonal to the roller axial direction in a state in which the conveyance pressure roller control plate is positioned at a second slide.

FIG. 7 is a front view from a direction orthogonal to the roller axial direction when the conveyance pressure roller control plate 43 is positioned at a first slide position S1. FIG. 8 is a front view from a direction orthogonal to the roller axial direction when the conveyance pressure roller control plate 43 is positioned at a second slide position S2.

The conveyance pressure roller control plate 43 is arranged on the opposite side of the conveyance roller 34*a* across the conveyance pressure roller 34*b*. The conveyance pressure roller control plate 43 extends along the roller axial direction. The conveyance pressure roller control plate 43 has an arc-shaped cross section centering on the support shaft 34*a*1 of the conveyance roller 34*a*. The conveyance pressure roller control plate 43 is supported slidably in the roller axial direction against the frame 41. The conveyance pressure roller control plate 43 is energized to one side in the roller axial direction (the left side of FIGS. 7 and 8) with respect to the frame 41. The conveyance pressure roller control plate 43 is energized to the one side in the roller axial direction by a spring force of a return spring 48. For example, the return spring 48 is a tension coil spring that expands and contracts in the roller axial direction.

The pivot arm 46 is supported on the other side in the roller axial direction of the support shaft 34*a*1 of the conveyance roller 34*a* (the right side of FIGS. 7 and 8). The pivot arm 46 is arranged on the other side (outside) in the roller axial direction with respect to the arm portion 42*c* of the conveyance pressure roller holder 42. The pivot arm 46 includes an arm gear 46*b* and an arm portion 46*c*. The arm gear 46*b* has a disk shape and is provided coaxially with the support shaft 34*a*1 of the conveyance roller 34*a*. The arm portion 46*c* extends radially outward from a part of the arm gear 46*b* in the circumferential direction thereof. A first locking pin 46*d* that protrudes radially outward is provided at a tip of the arm portion 46*c*.

An arm-side cam groove 44 is formed in the conveyance pressure roller control plate 43 on the other side in the roller axial direction thereof. The arm-side cam groove 44 is engaged with the first locking pin 46*d* of the pivot arm 46. The arm-side cam groove 44 is inclined in such a manner that it becomes close to the one side in the roller axial direction at an upper side of FIGS. 7 and 8.

The conveyance pressure roller control plate 43 is positioned at a movable end on the one side in the roller axial direction (first slide position S1) through an energization force from the return spring 48 when driving of the sheet feed roller 23*a* is stopped. The state is referred to as "an initial state of the conveyance pressure roller control plate 43" in the following description.

FIG. 7 shows a state in which the driving of the sheet feed roller 23*a* is stopped and the conveyance pressure roller control plate 43 is in the initial state. At this time, the first locking pin 46*d* of the pivot arm 46 is positioned at a lower end position of the arm-side cam groove 44. The first locking pin 46*d* also receives a weight of the arm portion 46*c* of the pivot arm 46 to move to the lower end position of the arm-side cam groove 44.

When the sheet feed roller 23*a* is driven, the driving force from the sheet feed roller 23*a* is transmitted to the pivot arm 46 via the relay section 47. In this way, the pivot arm 46 pivots so as to move the first locking pin 46*d* at the tip of the arm portion 46*c* upward. At this time, the first locking pin 46*d* slides in the arm-side cam groove 44 to move the conveyance pressure roller control plate 43 to the other side in the roller axial direction. At this time, the conveyance pressure roller control plate 43 moves against the energization force from the return spring 48.

FIG. 8 shows a state in which the first locking pin 46*d* of the pivot arm 46 moves until it abuts against an upper end position of the arm-side cam groove 44. At this time, the conveyance pressure roller control plate 43 is positioned at a movable end on the other side in the roller axial direction (second slide position S2). The state is referred to as an "operation state of the conveyance pressure roller control plate 43" in the following description. After the first locking pin 46*d* abuts against the upper end position of the arm-side cam groove 44, the torque limiter 47*c* described below slips to release torque of the sheet feed roller 23*a*.

The conveyance pressure roller control plate 43 has a length from an intermediate portion in the roller axial direction of the frame 41 to an end on the other side in the roller axial direction thereof. The conveyance pressure roller control plate 43 is arranged at the outside in a radial direction of the center of the support shaft **34*a*1 of the conveyance roller 34*a* with respect to the beam portion 42*b* of the conveyance pressure roller holder 42. A second locking pin 42*d* is provided at the intermediate portion in the roller axial direction of the beam portion 42*b* of the conveyance pressure roller holder 42 so as to project to the outside in the radial direction (i.e., the conveyance pressure roller control plate 43** side).

A roller-side cam groove 45 is formed on the one side in the roller axial direction of the conveyance pressure roller control plate 43. The roller-side cam groove 45 engages with the second locking pin **42*d* of the conveyance pressure roller holder 42. The roller-side cam groove 45 includes an inclined portion 45*a*, an upper end extension portion 45*b* and a lower end extension portion 45*c*. The inclined portion 45*a* is inclined in such a manner that it becomes close to the other side in the roller axial direction at an upper side of FIGS. 7 and 8. The upper end extension portion 45*b* extends from the upper end of the inclined portion 45*a* to the other side in the roller axial direction along the roller axial direction. The lower end extension portion 45*c* extends from the lower end of the inclined portion 45*a*** to the one side in the roller axial direction along the roller axial direction.

Figure 9:
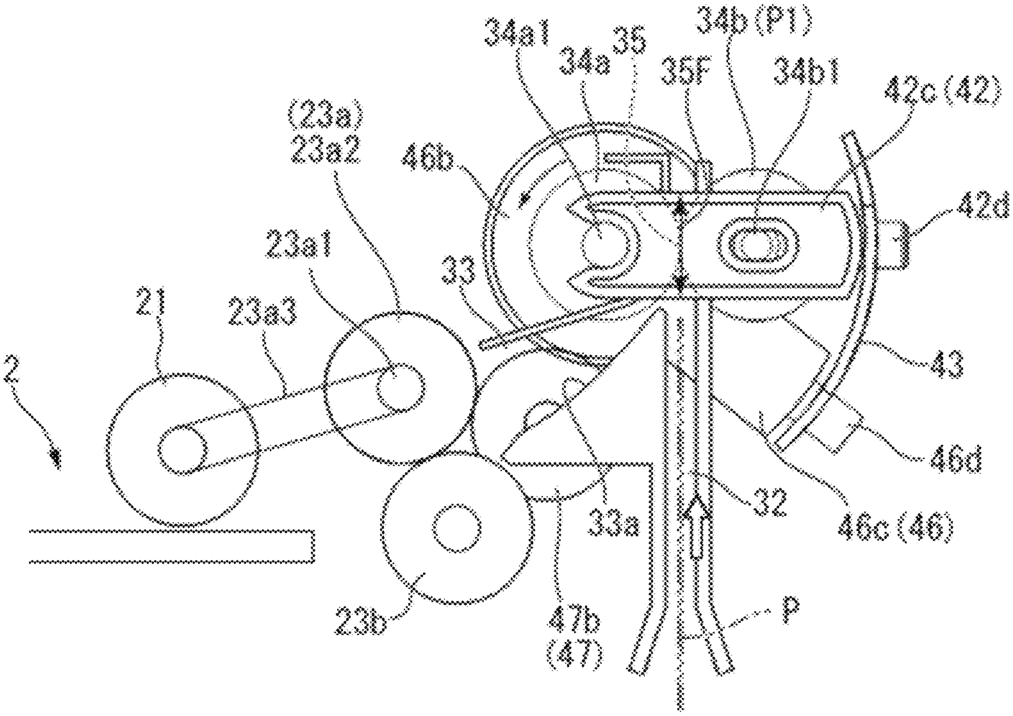
FIG. 9 is a side view illustrating the conveyance roller unit of the sheet feed device according to the embodiment as viewed from the roller axial direction in a state in which the conveyance pressure roller is positioned at the first pivot position.

FIG. 9 is a side view illustrating the conveyance roller unit 40 as viewed from the roller axial direction when the conveyance pressure roller **34*b* is positioned at the first pivot position P1**.

Figure 10:
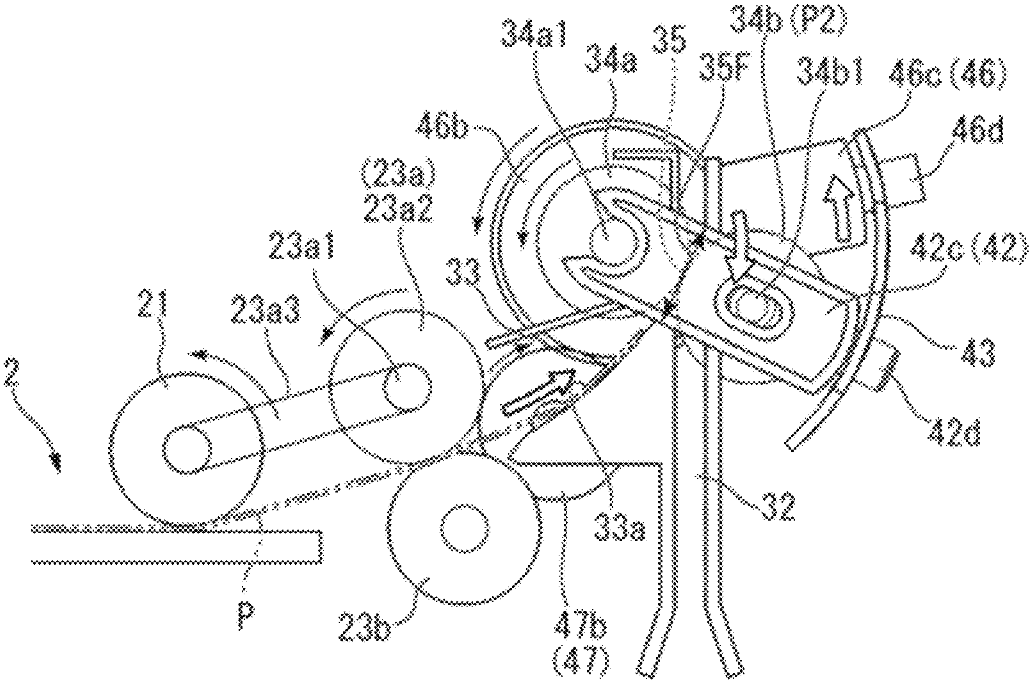
FIG. 10 is a side view illustrating the conveyance roller unit of the sheet feed device according to the embodiment as viewed from the roller axial direction in a state in which the conveyance pressure roller is positioned at the second pivot position.

FIG. 10 is a side view illustrating the conveyance roller unit 40 as viewed from the roller axial direction when the conveyance pressure roller **34*b* is positioned at the second pivot position P2**.

A state in which the driving of the sheet feed roller **23*a* is stopped and the conveyance pressure roller control plate 43 is in the initial state is shown. At this time, the second locking pin 42*d* of the conveyance pressure roller holder 42 is positioned at the upper end extension portion 45*b* of the roller-side cam groove 45. At this time, the second locking pin 42*d* and the conveyance pressure roller holder 42 restricts the pivot around the support shaft 34*a*1 of the conveyance roller 34*a***.

If the sheet feed roller **23*a* is driven to move the conveyance pressure roller control plate 43 to the other side in the roller axial direction, the following effects are achieved. The second locking pin 42*d* of the conveyance pressure roller holder 42 is guided into the roller-side cam groove 45 to move along the inclined portion 45*a* downward. In this way, the conveyance pressure roller holder 42 pivots downward. When the conveyance pressure roller control plate 43 shifts to the operation state, the second locking pin 42*d* of the conveyance pressure roller holder 42 moves to the lower end extension portion 45*c* of the roller-side cam groove 45. At this time, the second locking pin 42*d* and the conveyance pressure roller holder 42 restrict the pivot around the support shaft 34*a*1 of the conveyance roller 34*a***.

The driving force from the sheet feed roller **23*a* is transmitted via the transmission mechanism 43A, and in this way, the pivot arm 46 pivots. The pivot arm 46 pivots in a direction of moving the tip of the arm upward (first direction) through the driving force from the sheet feed roller 23*a*. At this time, the first locking pin 46*d* of the pivot arm 46 moves from the lower end position of the arm-side cam groove 44 of the conveyance pressure roller control plate 43 towards the upper end position thereof. At this time, along the inclination of the arm-side cam groove 44, the conveyance pressure roller control plate 43** moves to the other side in the roller axial direction.

If the conveyance pressure roller control plate 43 moves to the other side in the roller axial direction, the second locking pin **42*d* of the conveyance pressure roller holder 42 is guided into the roller-side cam groove 45 to move. The second locking pin 42*d* of the conveyance pressure roller holder 42 moves from the upper end extension portion 45*b* of the roller-side cam groove 45 towards the lower end extension portion 45*c*. At this time, the conveyance pressure roller holder 42 pivots downward to pivot the conveyance pressure roller 34*b* from the first pivot position P1 to the second pivot position P2**.

If an operation of starting the driving of the sheet feed roller **23*a* to convey the sheet P from the sheet feed cassette 2 is finished, the driving of the sheet feed roller 23*a* is stopped under the control. When the driving of the sheet feed roller 23*a* is stopped, no driving force is transmitted to the pivot arm 46. The conveyance pressure roller control plate 43 moves to the one side in the roller axial direction through the energization force of the return spring 48** and returns to the initial position.

If the conveyance pressure roller control plate 43 moves to the one side in the roller axial direction, the first locking pin **46*d* of the pivot arm 46 moves along the arm-side cam groove 44. The first locking pin 46*d* moves from the upper end position of the arm-side cam groove 44 towards the lower end position thereof. At this time, the pivot arm 46** pivots downward to return to the initial position.

If the conveyance pressure roller control plate 43 moves to the one side in the roller axial direction, the second locking pin **42*d* of the conveyance pressure roller holder 42 moves along the roller-side cam groove 45. The second locking pin 42*d* moves from the lower end extension portion 45*c* of the roller-side cam groove 45 towards the upper end extension portion 45*b* thereof. At this time, the conveyance pressure roller holder 42** pivots upward to return to the initial position.

The pivot of the pivot arm 46 is restricted by the first locking pin **46*d* abutting against the upper end position and the lower end position of the arm-side cam groove 44. At this time, movement of the conveyance pressure roller control plate 43 in the roller axial direction is also restricted. When the movement of the conveyance pressure roller control plate 43 in the roller axial direction is restricted, the driving force (torque) from the sheet feed roller 23*a* is released by the torque limiter 47*c* provided at the relay section 47. The torque limiter 47*c* causes slippage of the input/output members according to a prescribed torque value. In this way, the slide of the conveyance pressure roller control plate 43 is stopped while the sheet feed roller 23*a*** drives.

The roller-side cam groove 45 includes the upper end extension portion **45*b* and the lower end extension portion 45*c*. At the time the slide of the conveyance pressure roller control plate 43 is stopped, the first locking pin 46*d* of the pivot arm 46 is positioned at either the upper end extension portion 45*b* or the lower end extension portion 45*c*. In this way, the pivot position of the conveyance pressure roller holder 42 is accurately specified. If the roller-side cam groove 45 only includes the inclined portion 45*a*, the pivot position of the conveyance pressure roller holder 42 is easily influenced. This is because a position shift in the roller axial direction of the conveyance pressure roller control plate 43 affects the pivot position of the conveyance pressure roller holder 42**.

The roller-side cam groove 45 on the other side in the roller axial direction cancels the position shift in the roller axial direction of the conveyance pressure roller control plate 43 by including the upper end extension portion 45*b* and the lower end extension portion 45*c* along the roller axial direction. In this way, the shift in the pivot position of the conveyance pressure roller holder 42 can be suppressed. Even if the conveyance pressure roller receives an input such as a reaction force from the sheet P, the input is received by the upper end extension portion 45*b* and the lower end extension portion 45*c*.

The relay section 47 is provided between a sheet feed roller shaft gear 23*a*2 and the arm gear 46*b* of the pivot arm 46. The sheet feed roller shaft gear 23*a*2 is supported on the other side in the roller axial direction of the support shaft 23*a*1 of the sheet feed roller 23*a*. The relay section 47 is arranged on the other side (outside) in the roller axial direction with respect to the side plate 41*a* on the other side in the roller axial direction of the frame 41.

The relay section 47 includes a relay gear support shaft 47*a* and a torque limiter gear 47*b* supported by the relay gear support shaft 47*a*. The torque limiter gear 47*b* includes a drive side gear 47*b*1 and a driven side gear 47*b*2, which are coaxial with each other. The drive side gear 47*b*1 meshes with the sheet feed roller shaft gear 23*a*2, and the driven side gear 47*b*2 meshes with the arm gear 46*b* of the pivot arm.

Figure 11:
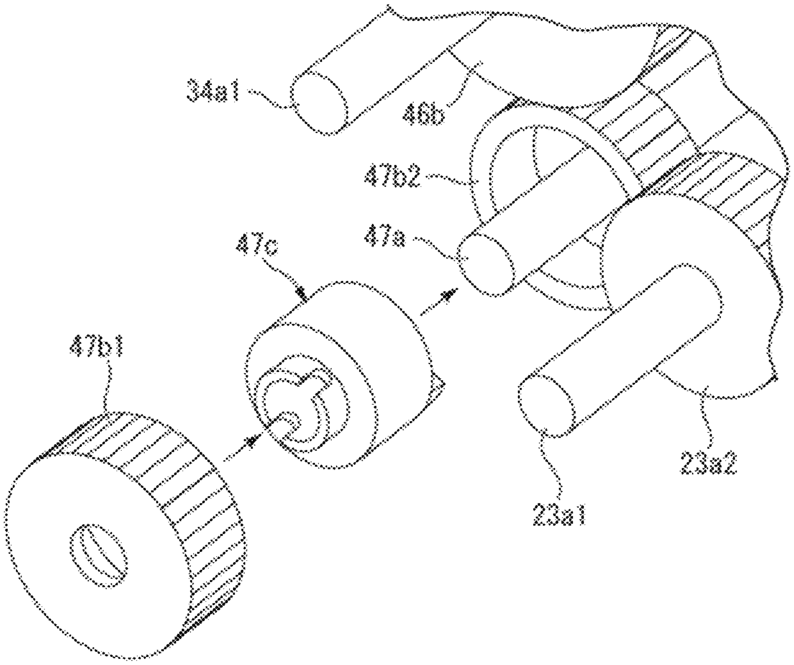
FIG. 11 is an exploded perspective view illustrating a torque limiter gear of the conveyance roller unit of the sheet feed device according to the embodiment.

FIG. 11 is an exploded perspective view illustrating the torque limiter gear 47*b* of the conveyance roller unit 40.

The torque transmission between the drive side gear 47*b*1 and the driven side gear 47*b*2 is made via the torque limiters 47*c* accommodated in both gears. The torque limiter 47*c* can transmit a torque described below between the both gears. The torque transmitted between both gears is set according to a friction set between a pair of rotation elements. If the rotation of one (driven side) of the pair of rotation elements is constrained, the torque limiter 47*c* idles the other one thereof (drive side). In this way, the rotation on the driven side is stopped while maintaining the rotation on the drive side.

The sheet feed device 1 and the image forming apparatus 100 according to the embodiment include the conveyance roller pair 34 provided in the conveyance path merging section 32*a*, the variable mechanism 42A for making the arrangement angle of one roller (conveyance pressure roller 34*b*) of the conveyance roller pair 34 to the other roller (conveyance roller 34*a*) thereof variable, and the transmission mechanism 43A for transmitting the driving force from the sheet feed roller 23*a* provided in the carry-out path 33 from the sheet feed cassette 2 to the operating portion (conveyance pressure roller holder 42) of the variable mechanism 42A.

In the sheet feed device 1 and the image forming apparatus 100 according to the embodiment, the conveyance pressure roller 34*b* of the conveyance roller pair 34 pivots around the conveyance roller 34*a* through the driving force from the sheet feed roller 23*a* provided in the carry-out path 33 from the sheet feed cassette 2. The sheet feed device 1 makes the arrangement angle of the conveyance pressure roller 34*b* to the conveyance roller 34*a* variable in conjunction with the driving of the sheet feed roller 23*a*. Even in a case in which the sheet P is conveyed from the main conveyance path or the carry-out path 33 which are different sheet conveyance paths, the sheet feed device 1 sets the arrangement angle of the conveyance roller pair 34 to a suitable angle. The sheet feed device 1 allows the sheet P conveyed from either the main conveyance path or the carry-out path 33 to smoothly enter the nip 35, and in this way, the tip of the sheet is difficult to abut against the conveyance roller pair 34. Therefore, the sheet P can be smoothly conveyed without increasing the conveyance resistance of the sheet P.

Since the sheet feed device 1 uses the driving force from the sheet feed roller 23*a* as a motive power to operate the conveyance pressure roller 34*b*, a dedicated electric component is not necessary. Therefore, the increase in cost due to a component capable of moving the conveyance pressure roller 34*b* can be suppressed.

The transmission mechanism 43A includes the pivot arm 46 pivoting around the support shaft 34*a*1 of the conveyance roller 34*a* through the driving force from the sheet feed roller 23*a*, and the conveyance pressure roller control plate 43 that engages with the first locking pin 46*d* of the pivot arm 46 and moves in the roller axis direction as the pivot arm 46 pivots.

The variable mechanism 42A includes the conveyance pressure roller holder 42 for supporting the conveyance pressure roller 34*b* of the conveyance roller pair 34, enabling the second locking pin 42*d* to engage with the conveyance pressure roller control plate 43, and pivoting around the support shaft 34*a*1 of the conveyance roller 34*a* in conjunction with the movement in the roller axial direction of the conveyance pressure roller control plate 43.

In the sheet feed device 1, the conveyance pressure roller control plate 43 that moves in the roller axis direction is interposed between the pivot arm 46 on the input side and the conveyance pressure roller holder 42 on the output side. If the reaction force from the sheet P is input to the conveyance pressure roller 34*b*, the conveyance pressure roller holder 42 returns to the state before the pivoting. The force (pivot force in a reverse direction) for returning the conveyance pressure roller holder 42 to the state before the pivot is received by the conveyance pressure roller control plate 43 that moves in the roller axis direction. Therefore, the pivot position of the conveyance pressure roller holder 42 can be easily specified.

The conveyance pressure roller holder 42 pivots around the support shaft 34*a*1 of the conveyance roller 34*a*. Since the support shaft 34*a*1 of the conveyance roller 34*a* is used as the pivot shaft of the conveyance pressure roller holder 42, the configuration can be simplified. Since the conveyance pressure roller holder 42 pivots coaxially with the conveyance roller 34*a*, the nip 35 of the conveyance roller pair 34 is equally maintained before and after the pivot of the conveyance pressure roller holder 42.

The pivot arm 46 pivots around the support shaft 34*a*1 of the conveyance roller 34*a*. Since the support shaft 34*a*1 of the conveyance roller 34*a* is used as the pivot shaft of the pivot arm 46, the configuration can be simplified. If the pivot shaft of the pivot arm 46 and the pivot shaft of the conveyance pressure roller holder 42 are common, these pivot structures become simple and compact.

Pivot directions of the pivot arm 46 and the conveyance pressure roller holder 42 in which the pivot arm 46 and the conveyance pressure roller holder 42 pivot as the conveyance pressure roller control plate 43 moves towards the one side in the axial direction are opposite to each other. In this way, the inertias accompanying the pivot of the pivot arm 46 and the conveyance pressure roller holder 42 cancel out. The pivot ranges of the pivot arm 46 and the conveyance pressure roller holder 42 are overlapped easily. In this way, the pivot spaces for the pivot arm 46 and the conveyance pressure roller holder 42 become compact.

The conveyance pressure roller control plate 43 is provided with the roller-side cam groove 45 with which the second locking pin 42*d* of the conveyance pressure roller holder 42 is engaged. The roller-side cam groove 45 includes the inclined portion 45*a* obliquely extending in such a manner that it becomes close to the one side in the roller axial direction when positioned on the one side in the pivot direction of the conveyance pressure roller holder 42, and the upper end extension portion 45*b* and the lower end extension portion 45*c* extending from the ends in the extension direction of the inclined portion 45*a* to the outside in the roller axial direction thereof (opposite to the inclined portion 45*a*) along the roller axial direction.

By including the upper end extension portion 45*b* and the lower end extension portion 45*c* along the roller axial direction at the ends of the roller-side cam groove 45, the following effects are achieved. If the second locking pin 42*d* of the conveyance pressure roller holder 42 is positioned at the upper end extension portion 45*b* and the lower end extension portion 45*c*, the pivot of the conveyance pressure roller holder 42 can be restricted easily. At this time, even if the conveyance pressure roller 34*b* receives the reaction force from the sheet P, the arrangement angle of the conveyance pressure roller 34*b* is maintained.

The conveyance pressure roller control plate 43 is provided with the arm-side cam groove 44 with which the first locking pin 46*d* of the rotating arm 46 is engaged. A width in the roller axial direction of the arm-side cam groove 44 is smaller than that in the roller axial direction of the roller-side cam groove 45. The arm-side cam groove 44 is provided within the width in the axial direction of the roller-side cam groove 45 in the roller axial direction.

The pivot arm 46 pivots until the first locking pin 46*d* abuts against the end of the arm-side cam groove 44. Even if the first locking pin 46*d* abuts against the end of the arm-side cam groove 44, the second locking pin 42*d* of the conveyance pressure roller holder 42 does not abut against the end of the roller-side cam groove 45. The second locking pin 42*d* of the conveyance pressure roller holder 42 stops in front of the end of the roller-side cam groove 45. In this way, the movement in the roller axial direction of the conveyance pressure roller control plate 43 and the pivot of the conveyance pressure roller holder 42 are accurately specified by the arm-side cam groove 44.

The transmission mechanism 43A is provided with the return spring 48 that energizes the conveyance pressure roller control plate 43 to the initial position.

After the operation of the variable mechanism 42A, even if the sheet feed roller 23*a* is not reversely rotated, the conveyance pressure roller control plate 43 is returned to the initial position through the spring force of the return spring 48. Through the spring force of the return spring 48, the pivot arm 46 and the conveyance pressure roller holder 42 are also returned to the initial positions thereof, respectively.

The transmission mechanism 43A includes the torque limiter 47*c* that interrupts torque transmission at a specified value or more.

The torque limiter 47*c* of the transmission mechanism 43A mechanically limits an upper limit value of the torque acting on the variable mechanism 42A. The configuration for managing the torque is simple as compared with the case of providing an electric component in a torque transmission path. After the operating portion (conveyance pressure roller holder 42) of the variable mechanism 42A reaches an operation limit position, the operation of the variable mechanism 42A can be stopped through the action of the torque limiter 47*c*.

The pivot arm 46 and the conveyance pressure roller holder 42 are not limited to rotating around the support shaft 34*a*1 of the conveyance roller 34*a*, and may pivot around another shaft. The conveyance roller pair 34 may increase or decrease a surface pressure of the nip 35 to handle the different thickness of the sheets P.

The main conveyance path 32 may be provided with a drive roller (conveyance roller). If the main conveyance path 32 is provided with the drive roller, the driving force from the drive roller may be utilized to change the arrangement angle of the conveyance pressure roller 34*b*.

According to at least one embodiment described above, the sheet feed device 1 and the image forming apparatus 100 include the conveyance roller pair 34, the variable mechanism 42A and the transmission mechanism 43A, and thus the sheet P can be conveyed smoothly without increasing the conveyance resistance of the sheet P.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A sheet feed device, comprising:

a first conveyance path and a second conveyance path different from the first conveyance path, the first conveyance path includes an upstream side roller that feeds a sheet to a downstream side in a conveyance direction; and a conveyance path merging section configured to merge the first conveyance path and a second conveyance path together, the conveyance path merging section comprising:

a conveyance roller pair configured to convey the sheet fed from the first conveyance path and the second conveyance path through a nip;

a variable mechanism configured to make an arrangement angle of one roller of the conveyance roller pair thereof variable, the arrangement angle of one roller of the conveyance roller pair being an arrangement angle at which the nip entering direction is directed to the first conveyance path and the arrangement angle of one roller of the conveyance roller pair being an arrangement angle at which the nip entering direction is directed to the second conveyance path; and a transmission mechanism configured to transmit a rotational driving force of the upstream side roller from the upstream side roller, wherein the variable mechanism makes the arrangement angle of one roller of the conveyance roller pair to the arrangement angle at which the nip entering direction is directed to the first conveyance path while the upstream side roller is rotating.

2. The sheet feed device according to claim 1, wherein the transmission mechanism comprises a torque limiter configured to interrupt torque transmission of the paper feed roller at a specified value or more.

3. The sheet feed device according to claim 1, wherein one roller of the conveyance roller pairs is a driven roller that follows the rotation of the other, and a variable mechanism configured to make the arrangement angle of the driven roller of the conveyance roller pair thereof variable.

4. The sheet feed device according to claim 1, wherein the variable mechanism makes the arrangement angle of the roller to the arrangement angle at which the nip entering direction is directed to the second conveyance path while the upstream side roller is not rotating.

5. An image forming apparatus, comprising:

a sheet feed device; and an image forming section configured to form an image on a sheet fed from the sheet feed device, wherein the sheet feed device further comprises:

a first conveyance path; and a conveyance path merging section configured to merge the first conveyance path with a second conveyance path, wherein the first conveyance path includes an upstream side roller that feeds the sheet to a downstream side in a conveyance direction, and the conveyance path merging section comprises a conveyance roller pair configured to convey the sheet fed from the first conveyance path through a nip;

a variable mechanism configured to make an arrangement angle of one roller of the conveyance roller pair thereof variable, the arrangement angle of one roller of the conveyance roller pair being an arrangement angle at which the nip entering direction is directed to the first conveyance path and the arrangement angle of one roller of the conveyance roller pair being an arrangement angle at which the nip entering direction is directed to the second conveyance path; and a transmission mechanism configured to transmit a rotational driving force of the upstream side roller from the upstream side roller, wherein the variable mechanism makes the arrangement angle of one roller of the conveyance roller pair to the arrangement angle at which the nip entering direction is directed to the first conveyance path while the upstream side roller is rotating.

6. The image forming apparatus according to claim 5, wherein the transmission mechanism comprises a torque limiter configured to interrupt torque transmission of the paper feed roller at a specified value or more.

7. The image forming apparatus according to claim 5, wherein one roller of the conveyance roller pairs is a driven roller that follows the rotation of the other, and a variable mechanism configured to make the arrangement angle of the driven roller of the conveyance roller pair thereof variable.

8. The image forming apparatus according to claim 5, wherein the variable mechanism makes the arrangement angle of the roller to the arrangement angle at which the nip entering direction is directed to the second conveyance path while the upstream side roller is not rotating.

9. A sheet feed method, comprising:

feeding a sheet to a downstream side in a conveyance direction through an upstream side roller in a first conveyance path;

merging the first conveyance path and a second conveyance path together by:

conveying the sheet fed from the first conveyance path and the second conveyance path through a nip of a conveyance roller pair;

making an arrangement angle of one roller of the conveyance roller pair thereof variable, the arrangement angle of one roller of the conveyance roller pair being an arrangement angle at which the nip entering direction is directed to the first conveyance path and the arrangement angle of one roller of the conveyance roller pair being an arrangement angle at which the nip entering direction is directed to the second conveyance path;

transmitting a rotational driving force of the upstream side roller from the upstream side roller; and making the arrangement angle of one roller of the conveyance roller pair to the arrangement angle at which the nip entering direction is directed to the first conveyance path while the upstream side roller is rotating.

10. The sheet feed method according to claim 9, further comprising:

interrupting torque transmission of the paper feed roller at a specified value or more.

11. The sheet feed method according to claim 9, wherein one roller of the conveyance roller pairs is a driven roller that follows the rotation of the other, further comprising:

making the arrangement angle of the driven roller of the conveyance roller pair thereof variable.

12. The sheet feed method according to claim 9, further comprising:

making the arrangement angle of the roller to the arrangement angle at which the nip entering direction is directed to the second conveyance path while the upstream side roller is not rotating.

* * * * *